United States Patent [19]

Averkiou

[11] Patent Number: 5,980,457
[45] Date of Patent: Nov. 9, 1999

[54] ULTRASONIC TRANSMIT PULSES FOR NONLINEAR ULTRASONIC IMAGING

[75] Inventor: Michalakis Averkiou, Kirkland, Wash.

[73] Assignee: ATL Ultrasound, Inc., Bothell, Wash.

[21] Appl. No.: 08/971,590

[22] Filed: Nov. 17, 1997

[51] Int. Cl.[6] .................................................. A61B 8/00
[52] U.S. Cl. ........................................................... 600/437
[58] Field of Search ................................ 600/456, 437, 600/443, 444, 447, 436; 128/916

[56] References Cited

U.S. PATENT DOCUMENTS

| 4,664,123 | 5/1987 | Iinuma et al. | 600/443 |
| 5,733,527 | 3/1998 | Schutt | 600/458 |

Primary Examiner—William E. Kamm
Assistant Examiner—Maulin Patel
Attorney, Agent, or Firm—W. Brinton Yorks, Jr.

[57] ABSTRACT

An ultrasonic diagnostic imaging system and method are provided for producing harmonic contrast images with harmonic components produced by the contrast agent with little interference from nonlinear tissue interaction. A method is described for developing predistorted ultrasonic transmit signals, the predistortion of which will be counteracted by the nonlinear effects of tissue and result in substantially linear waveforms at the location of the contrast agent. The echoes returned by the contrast agent will contain nonlinear components resulting from the interaction of a linear waveform with the agent, with reduced nonlinear components from nonlinear tissue effects.

23 Claims, 14 Drawing Sheets s0.4

ULTRASONIC TRANSMIT PULSES FOR NONLINEAR ULTRASONIC IMAGING

This invention relates to ultrasonic diagnostic imaging of nonlinear effects such as harmonic imaging and, in particular, to ultrasonic transmit pulses for ultrasonic diagnostic imaging systems.

Ultrasonic diagnostic imaging systems are currently available which can produce images from frequencies of returning echoes which occupy a frequency spectrum other than the fundamental transmit frequency band. The most prevalent non-fundamental spectra used are the spectra of harmonics of the fundamental frequency. Harmonic echoes can be generated in the body in two ways. One is the harmonics produced by nonlinear scattering from contrast agents present in the body when an ultrasonic wave impinges upon the agent. These harmonics arise by virtue of the nonlinear oscillation or destruction of the contrast agent medium, and the echo radiated back from the agent has a strong harmonic component. The second mechanism which produces harmonic echoes is due to the distortion of an ultrasonic wave as it travels through the tissue of the body. This distortion causes the harmonic content of the transmitted ultrasonic wave to build as the wave travels through the body. When the transmitted wave encounters an acoustic target in the body which reflects an echo, the echo will contain not only the fundamental frequency components but harmonic components also.

When performing harmonic imaging of tissue using echoes resulting from the naturally occurring distortion of transmitted ultrasonic waves, no consideration need be given to effects from contrast agents, since an agent is not used for the technique. Hence there is no interference or conflict due to harmonic components from the two sources, since the only harmonics present are those produced by the distortion of the transmitted wave as it travels through the body. However, when performing harmonic imaging with a contrast agent, harmonic components will be present from both sources. Harmonic components will be returned from the nonlinear behavior of the contrast agent, and also from tissue and fluids due to the distortion of the transmitted wave. In many contrast exams the examining physician wants to view an image solely produced from the harmonic components returned from the contrast agent in the blood. Harmonic components from nonlinear tissue effects, while usually occurring 20 dB or so below the harmonic signals returned by the contrast agent, may be viewed as unwanted interfering signals. Although threshold clipping may eliminate many of the naturally occurring harmonic components, it would be desirable in such circumstances to completely eliminate the harmonic components resulting from distortion of the transmitted pulses, so that the only harmonic components used for imaging are those returned from the contrast agent.

In accordance with the principles of the present invention, ultrasonic harmonic imaging is performed with transmit waveforms which are predistorted to account for the distortion the waveforms undergo as they travel through the body. By predistorting the waveforms opposite to the distortion experienced in the body in consideration of the expected distortion effects of the body, the transmitted predistorted waveforms effectively become more linear as they travel through the body. Since the distortion of the body is a continuous phenomenon, there will come a point when a properly predistorted transmit waveform has attained a virtually undistorted form, whereafter further travel will continue to distort the waveform. In a preferred embodiment, this point at which the waveform becomes linear is used as the target depth for imaging, for example, the focal point of the transducer.

In a preferred embodiment the transmitted waveform is developed by computing the effects on an ultrasonic transmit waveform as it travels its transmit and receive paths through tissue. This is done by use of a tissue model from which the effects of passage of the transmitted waveform through tissue are predicted. This enables the identification of a predistorted waveform which can be transmitted so as to be in a substantially linear form at the time it impinges upon a nonlinear medium such as a contrast agent, thereby enabling the return of echo signals with nonlinear components which are predominately a function of the interaction of a substantially undistorted waveform with the contrast agent microbubbles.

Figure 1A:
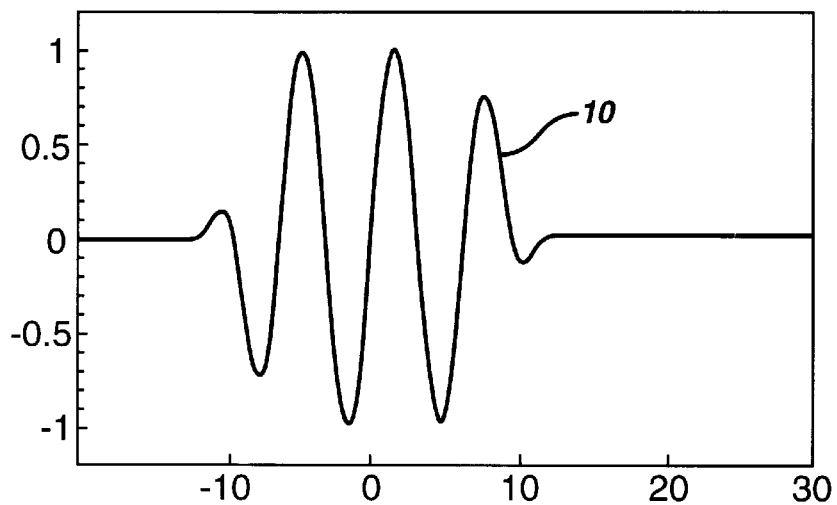
FIGS. 1a–1f illustrate the progressive distortion of a linear ultrasonic waveform as it proceeds through tissue from the skinline of a patient.
Figure 1B:
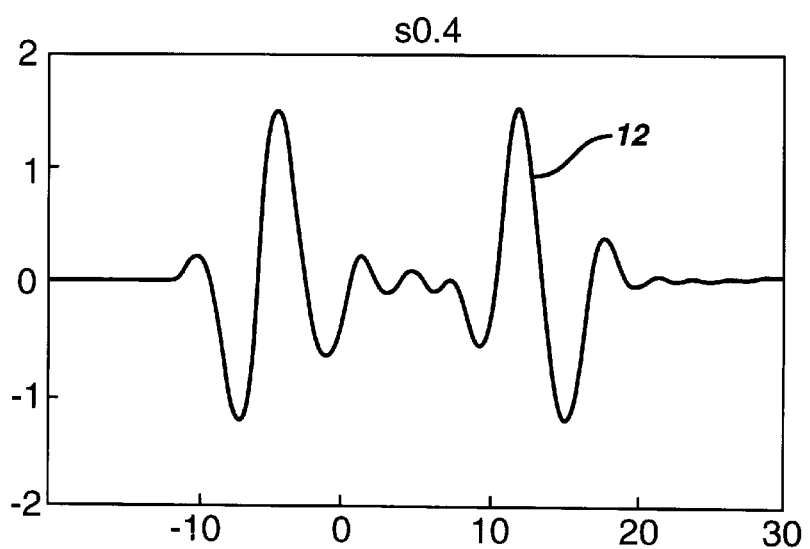

Referring first to FIGS. 1a–1f, the progressive distortion of an ultrasonic waveform as it travels through tissue is illustrated. This sequence of drawings shows a transmitted waveform at various proportions of the focal distance of the transmitted waveform or transducer. FIG. 1a shows a smoothly varying ultrasonic pulse waveform 10 which is to be transmitted through tissue of the body. Waveform 10 is a sinewave with some amplitude modulation of the waveform envelope, and is substantially linear in spectral content. It is assumed in this example that waveform 10 is transmitted into tissue toward an acoustic target at the focal point of the transducer. When the transmitted waveform has traveled to a point which is 40% of the distance to the focal point, the waveform appears as shown by waveform 12 in FIG. 1b. The irregular shape of the waveform at this point is due to diffraction effects, as the transmitted beam is only beginning to come into focus.

Figure 1C:
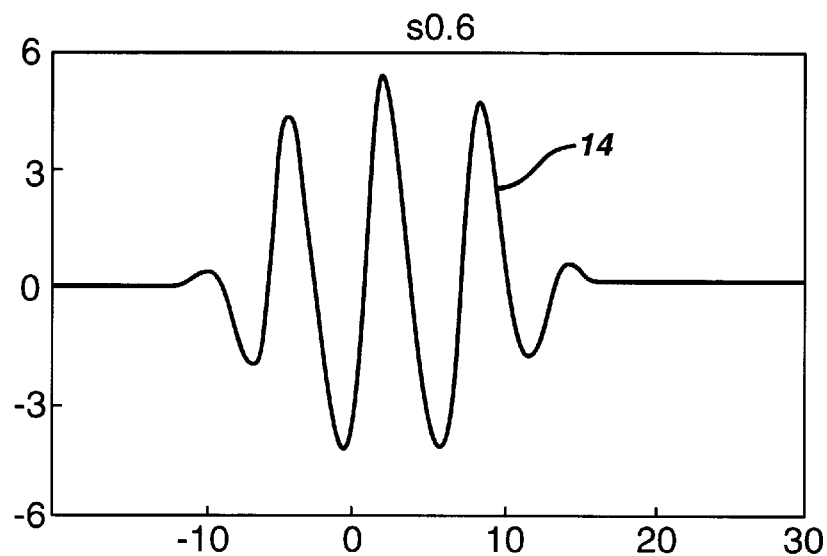
Figure 1D:
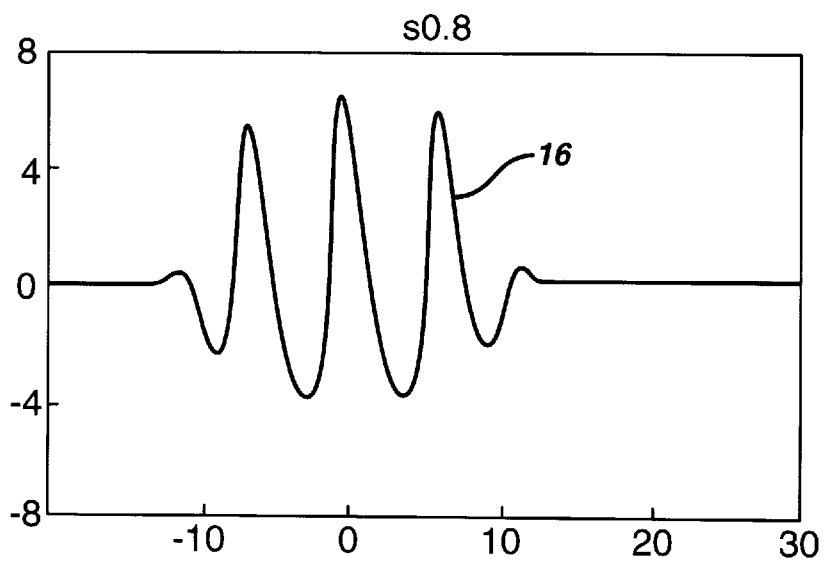
Figure 1E:
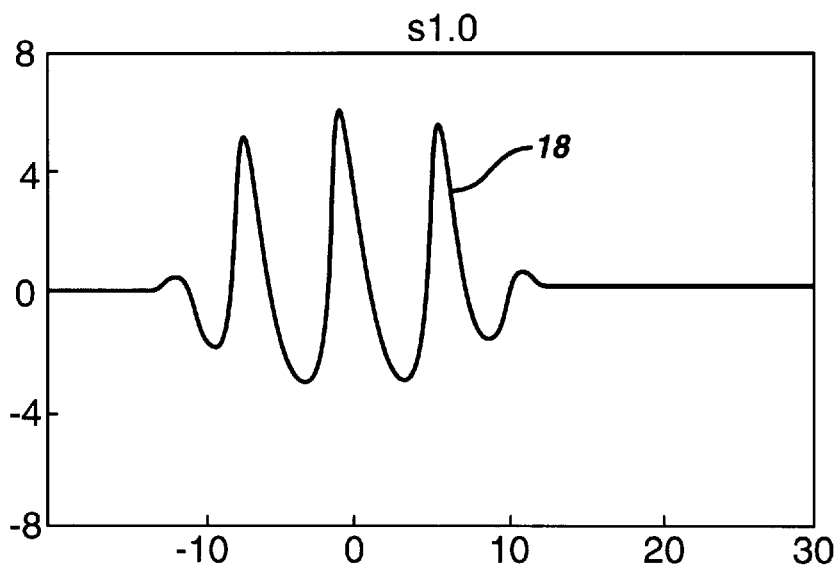
Figure 1F:
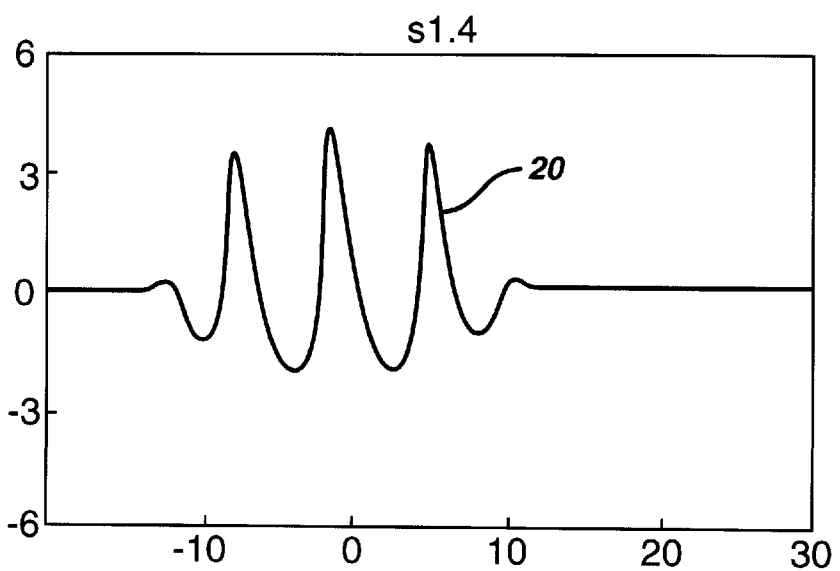

When the transmitted waveform has traveled to a point which is 60% of the distance to the focal point, it is beginning to come into focus and has the appearance shown by waveform 14 in FIG. 1c. At this point the waveform is still mainly linear in spectral content. By the time the transmitted waveform has traveled to a point which is 80% of the distance to the focal point, it has experienced sufficient nonlinear effects due to its passage through tissue such that the waveform is beginning to exhibit a subtle nonlinearity, as illustrated by waveform 16 in FIG. 1d. These nonlinearities of the waveform arise predominately due to amplitude-dependent, differential velocity effects on the transmitted waveform. These nonlinear effects are clearly apparent in the waveform 18 at the focal point as shown in FIG. 1e, and even more so beyond the focal point as shown by waveform 20 in FIG. 1f, which represents the waveform after it has traveled 140% of the focal range into the body.

Figure 2:
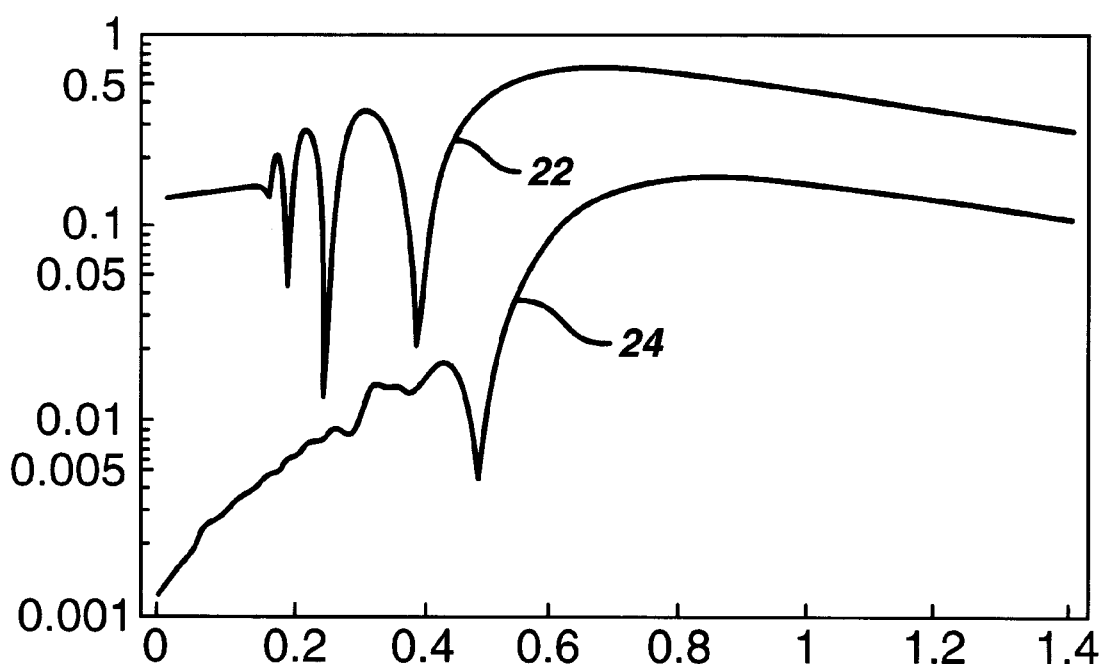
FIG. 2 illustrates the relative amounts of energy in the fundamental and second harmonic spectra as a transmitted ultrasonic pulse travels through tissue.

The evolution of the buildup and change of fundamental frequency energy and harmonic frequency energy of an ultrasonic pulse transmitted through tissue is illustrated in FIG. 2. The abscissa of FIG. 2 is quantized in fractions of the distance of travel of the pulse to the focal point, where the focal distance is represented as "1". The ordinate is in normalized units of energy. The upper curve 22 illustrates the evolution of energy in the fundamental frequency spectrum of the pulse. Following some diffraction effects in the 0.2 to 0.4 range, the fundamental frequency energy peaks at around 0.7 of the focal distance, then tapers off with the effects of depth dependent attenuation at the focal point 1 and beyond. The lower curve 24 illustrates the buildup of harmonic frequency energy. The curve 24 begins at a very low level, since the transmitted waveform is mostly linear. But as the transmitted waveform is distorted by its travel through tissue, harmonic energy begins to build. Following some diffraction effects in the 0.3 to 0.5 range, the harmonic energy content peaks at about 0.9 of the focal distance, albeit at a lower level than the fundamental energy peak, then declines with depth dependent attenuation. There is seen to be a substantial quantum of both fundamental and harmonic energy present when the ultrasonic wave reaches the focal point 1.

Suppose that the transducer producing the waveforms of FIGS. 1a–1f was set to focus at the myocardium of the heart, which has been infused with a harmonic contrast agent. Harmonic contrast agents exhibit nonlinear behavior which is believed to arise from the nonlinear oscillation of a contrast agent microbubble as it is struck with an ultrasonic wave. When imaging myocardial perfusion of a contrast agent, it is desired that all of the received harmonic and other nonlinear energy effects be due to these behaviors of the contrast agent. The reproduction of an image from the nonlinear echo components will then sharply reveal the lumens of the vessels infused by the contrast agent, enabling perfusion of the myocardium to be precisely gauged or quantified, and occlusions identified.

However, if harmonic signal components are returning from targets other than the contrast agent, the ability to sharply define agent-perfused tissue is diminished. This will occur, for instance, when the waveform 18 with its significant harmonic content is reflected by cells or tissue. The reflected echo, although at a more attenuated level than harmonic signals received from the contrast agent, will nonetheless degrade the signal to noise ratio and resolution of the signals returned from the harmonic contrast agent. Hence it would be desirable to eliminate the harmonic content of the waveform 18, so that echoes returned from the impingement of the waveform on cells and tissue will be free of interfering harmonic components.

In accordance with the principles of the present invention, a technique for forming ultrasonic transmit waveforms is presented which produces waveforms with greatly diminished harmonic components at an acoustic target in the body. Substantially linear waveforms at the acoustic target are produced by transmitting a waveform which is predistorted in consideration of anticipated distortion effects, which effects reverse the predistortion, resulting in the development of a substantially linear waveform at the target.

The predistortion is determined by use of a model which predicts the distortion a waveform will undergo as it travels to a target from the transducer. A tangible model can be used to predict and measure these distortion effects empirically, such as a tissue equivalent phantom or by using an animal model. A linear waveform is transmitted through the phantom or model and the nonlinear components identified, for example by extracting them at a target distance with a filter. The nonlinear components are then combined in the transmit waveform. However, in accordance with a further aspect of the present invention, a mathematical model of tissue effects is used to predict the waveform distortion. A mathematical model which has been found to be effective is the Khokhlov-Zabolotskaya-Kuznetsov (KZK) nonlinear parabolic wave equation. This equation accurately models the combined effects of diffraction, absorption, and nonlinearity in directive sound beams and is of the form:

$$\frac{\partial^2 p}{\partial z \partial t'} = \frac{c_0}{2}\nabla_r^2 p + \frac{\delta}{2c_0^3}\frac{\partial^3 p}{\partial t'^3} + \frac{\beta}{2\rho_0 c_0^3}\frac{\partial^2 p^2}{\partial t'^2} \qquad (1)$$

where p is the sound pressure and z is the coordinate (depth or range or distance) along the axis of the beam. The first term on the right-hand side of equation (1) accounts for diffraction (focusing) effects, the second term accounts for thermoviscous absorption, and the third term accounts for nonlinearity of the tissue where $\beta$ is the coefficient of nonlinearity. Equation (1) is for a circular geometry. For rectangular geometries like the array transducers predominant in medical ultrasound, $\nabla^2$ is of the Cartesian form $$\nabla_\perp^2 = \partial^2 p/\partial x^2 + \partial^2 p/\partial y^2 \qquad (2)$$

Further details on the form and use of the KZK model may be found in my dissertation "Experimental Investigation of Propagation and Reflection Phenomena in Finite Amplitude Sound Beams," published by the University of Texas at Austin (May, 1994). In a constructed embodiment of the present invention an algorithm for a time domain solution to the KZK equation is used, as described in Y. -S. Lee, "Numerical solution of the KZK equation for pulsed finite amplitude sound beams in thermoviscous fluids," Ph.D. Dissertation, The University of Texas at Austin (1993).

To predict the distortion effects of tissue on a transmit waveform, the equation for the waveform and the range at which the waveform is to become linear is solved, referred to herein as the target plane. Generally, this is at the focal point of the transducer, as a transducer is usually focused at the range of the target to be imaged. Ranges before or after the focal point can also be chosen for the target plane, if desired. In the following example the target plane is set at the focal point of the transducer.

Figure 3A:
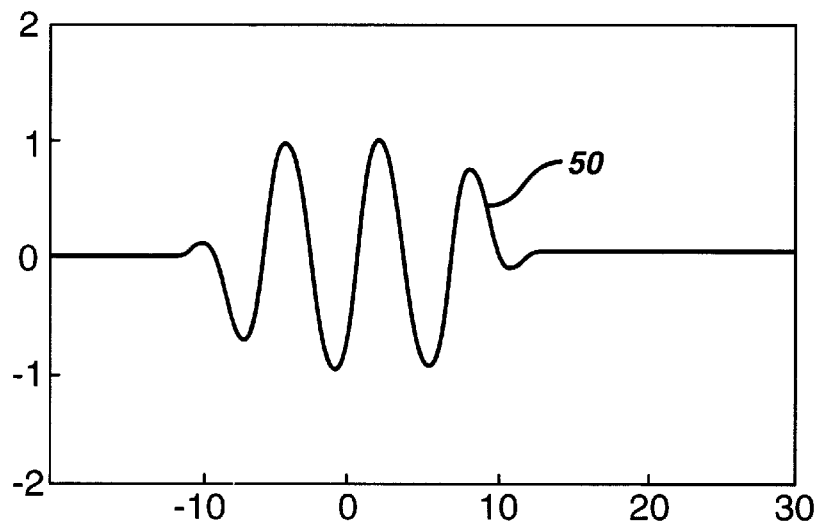
FIGS. 3a–3e illustrate the progressive changes of an ultrasonic waveform as it travels through a linear transmission medium from the transducer to the target plane.
Figure 3B:
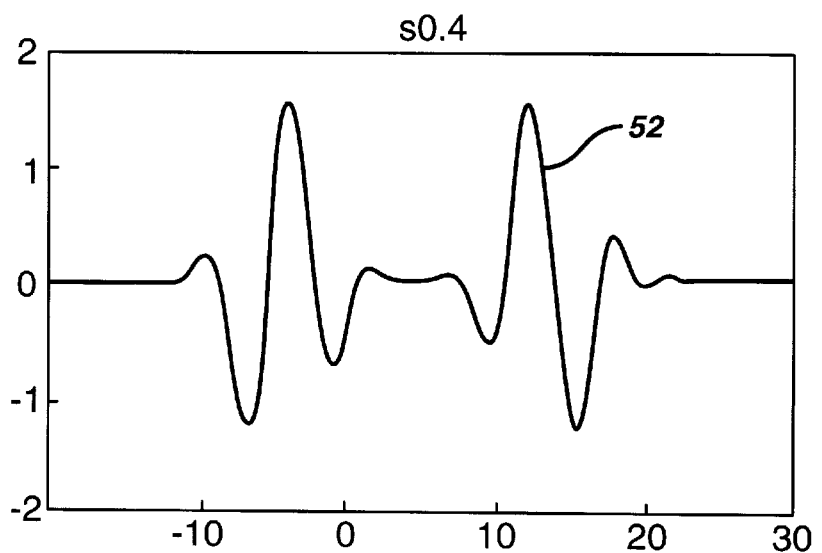
Figure 3C:
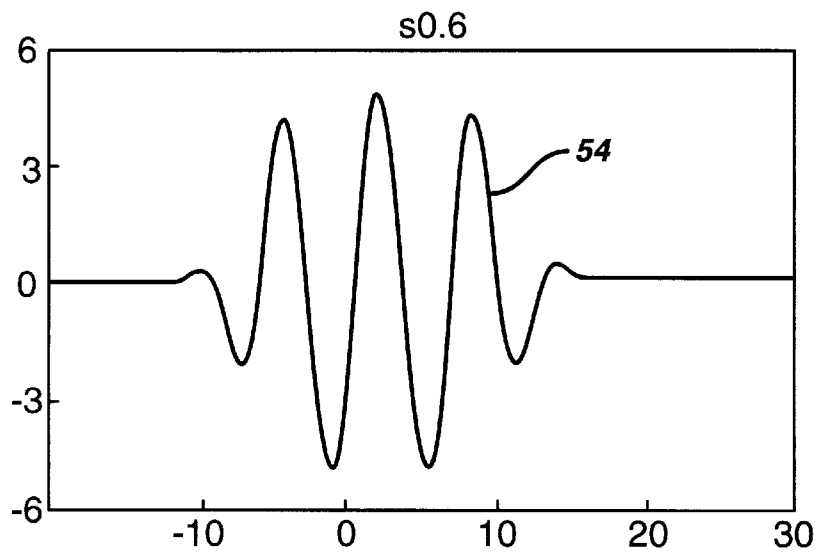
Figure 3D:
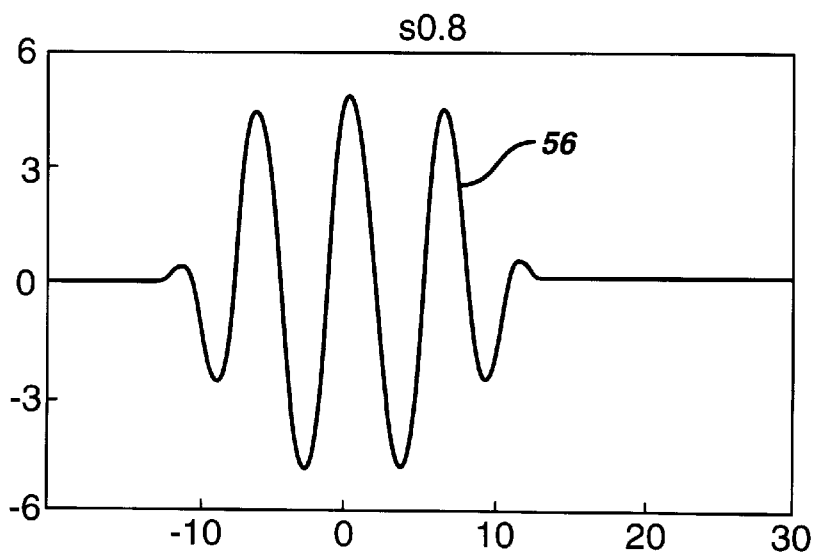
Figure 3E:
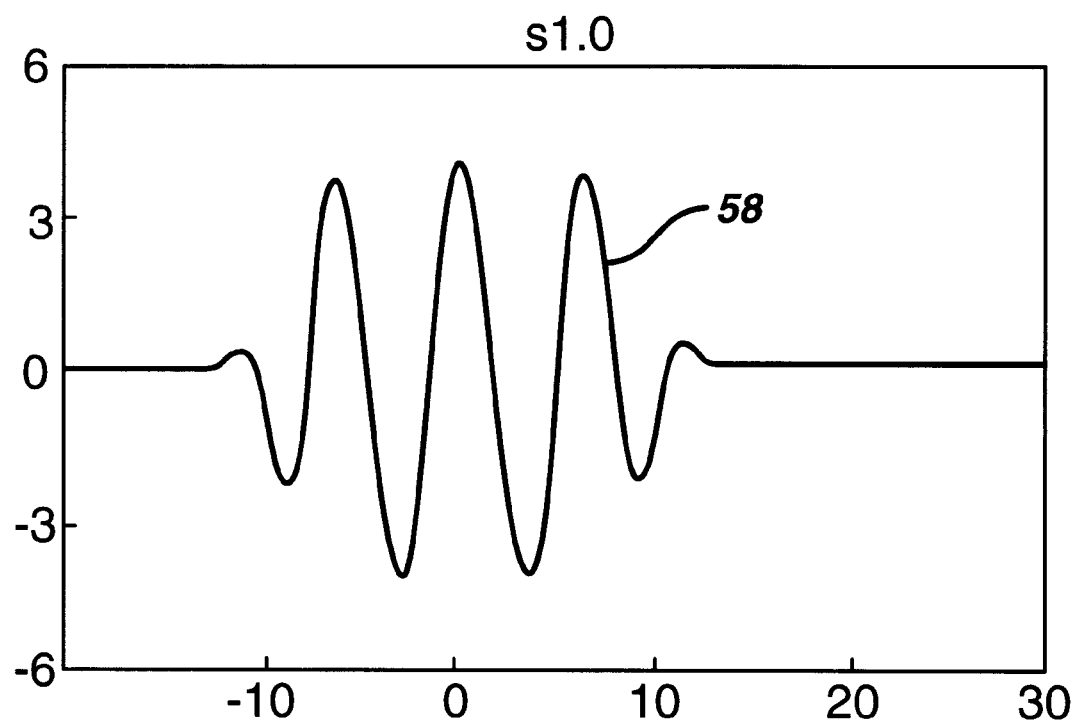
Figure 4A:
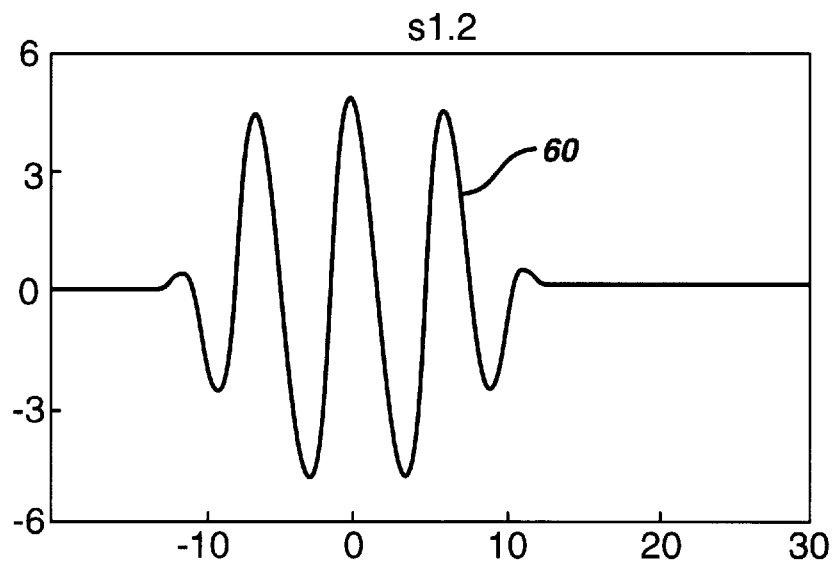
FIGS. 4a–4d illustrate the progressive changes of an ultrasonic waveform as it travels through a nonlinear transmission medium from the target plane back to the transducer.
Figure 4B:
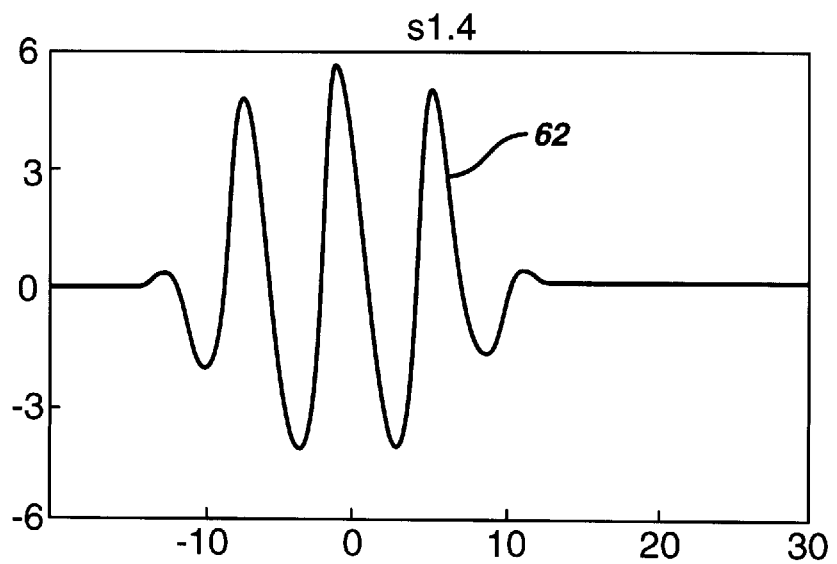
Figure 4C:
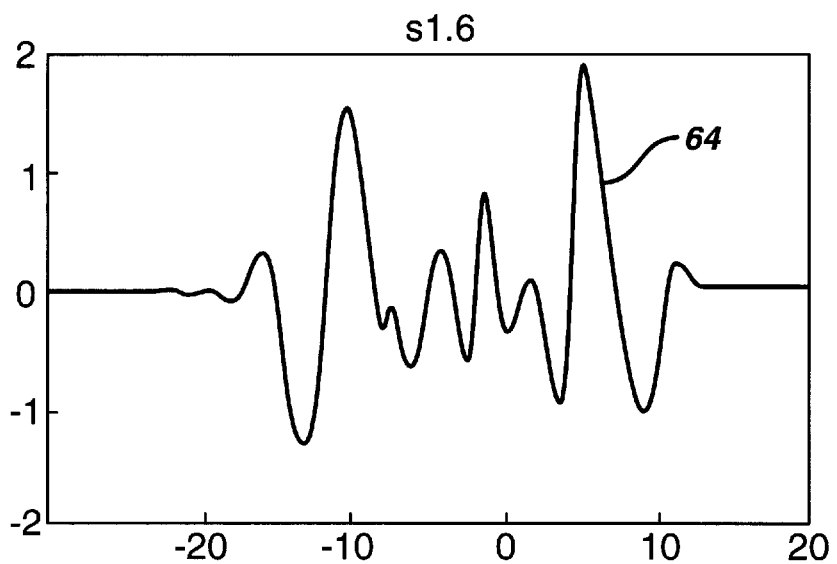
Figure 4D:
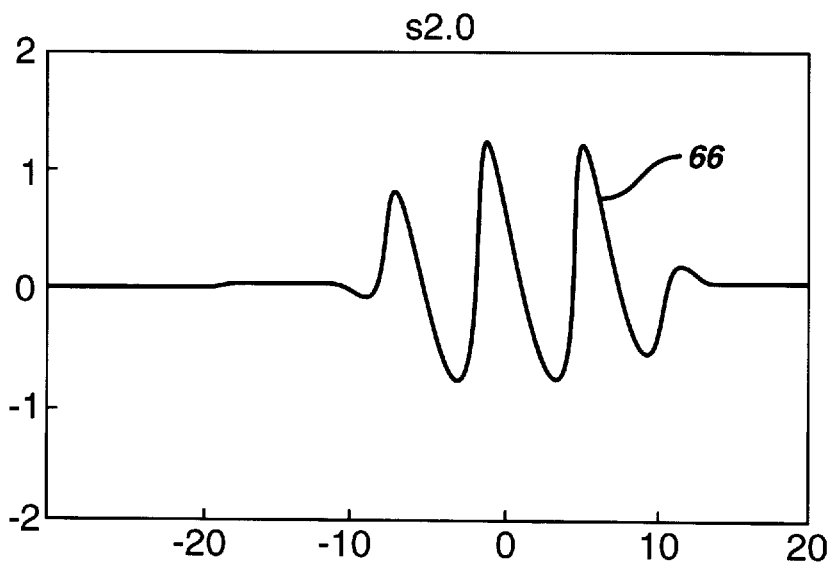

It must be borne in mind that the waveform at the target plane is only indirectly controlled by the system operator, that is, it is a function of the transmit waveform at the transducer and the effects encountered during passage to the target plane. The first step is to develop an expression of the desired linear field at the desired target plane for the transducer type and transmit waveform used. The KZK model is used to do this by applying it to the transmit waveform, with the exception of the third term, the nonlinearity term, since a linear field is desired at the target plane. The other two terms representing absorption and diffraction will model the depth dependent attenuation effect and the buildup in energy density as the transmitted waveform comes into focus. This produces results such as those shown in FIGS. 3a–3e. Waveform 50 in FIG. 3a illustrates an initial transmit waveform at the transducer. The next three figures show the waveforms 52, 54, and 56 at ranges which are 40%, 60%, and 80% of the distance from the transducer to the target plane, respectively. FIG. 3e shows a linear waveform 58 as it appears at the target plane for the given transducer type and transmit waveform 50. The original waveform 50 has been modified by diffraction and absorption effects during its travel to the target plane.

Figure 5A:
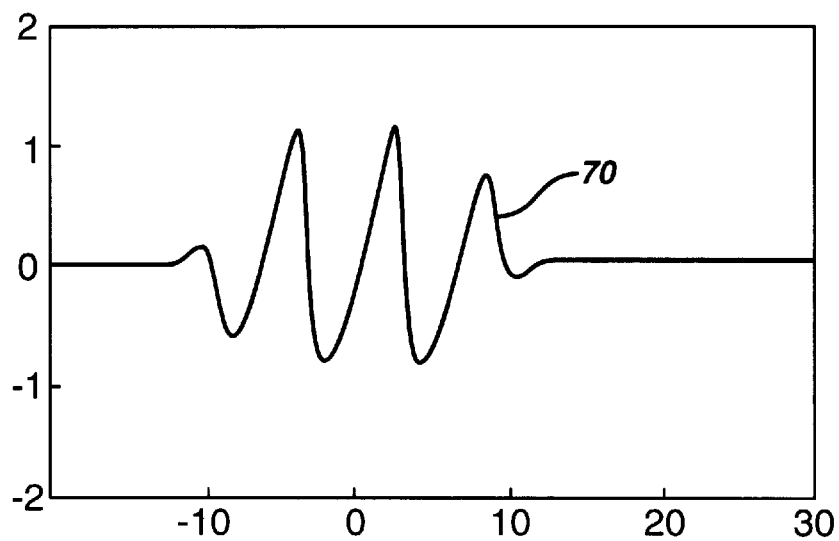
FIGS. 5a–5f illustrate the progressive changes of a predistorted ultrasonic waveform as it travels through tissue.

This accurate representation of the linear field produced at the target plane by the transducer is now used to predict the predistorted waveform which must be transmitted through tissue to result in the linear field at the target plane. This is done by use of the full KZK model, this time using all three terms to accurately predict nonlinear tissue effects. Because this is a computation of the reverse passage of the linear field waveform from the target plane back to the transducer, the waveform 58 is effectively time-reversed at the start of the computation. FIGS. 4a–4d show the waveforms calculated by the full KZK model as the time-reversed waveform experiences tissue effects on a reverse passage back to the transducer at 20% (waveform 60), 40% (waveform 62), 60% (waveform 64) and 100% (waveform 66) of the distance back to the transducer. Thus, waveform 66, once time reversed, represents the waveform which must be transmitted by the transducer to result in a linear field at the target plane. To account for the fact that waveform 66 was calculated in the direction from the target plane to the transducer and that a transmit waveform proceeds in the reverse direction, the waveform 66 is time-reversed to produce the desired transmit waveform 70 shown in FIG. 5a.

Waveform 70 is therefore a transmit waveform which has been predistorted to account for the distortion that will be encountered as the waveform travels through tissue from the transducer to the target plane, as well as other effects such as diffraction and attenuation. The predistortion of waveform 70 is in opposition to the normal distortion encountered by the waveform as it passes through tissue. This characteristic is discernible when comparing normally distorted waveform 18 of FIG. 1e with the predistorted waveform 70.

Figure 5B:
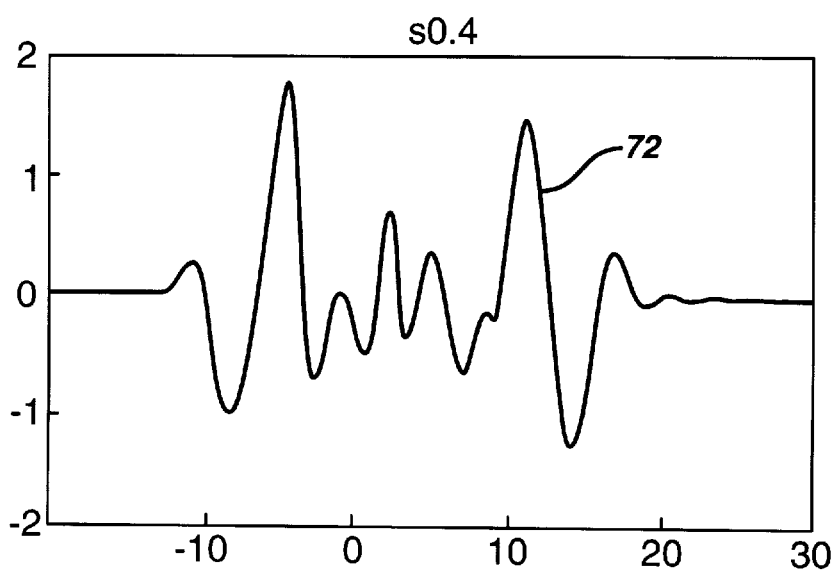
Figure 5C:
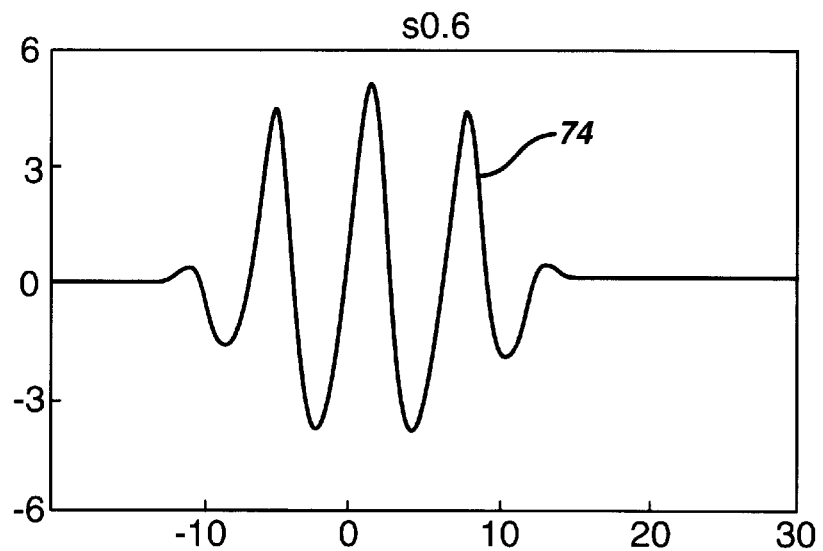
Figure 5D:
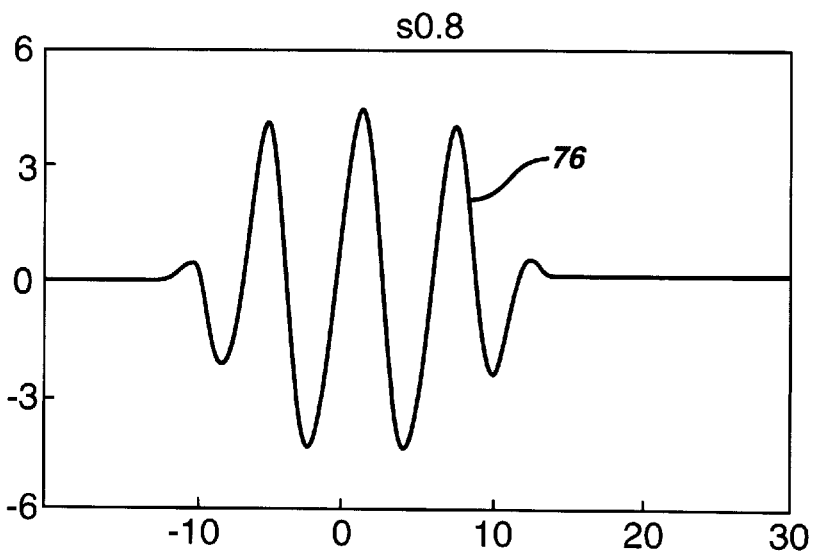
Figure 5E:
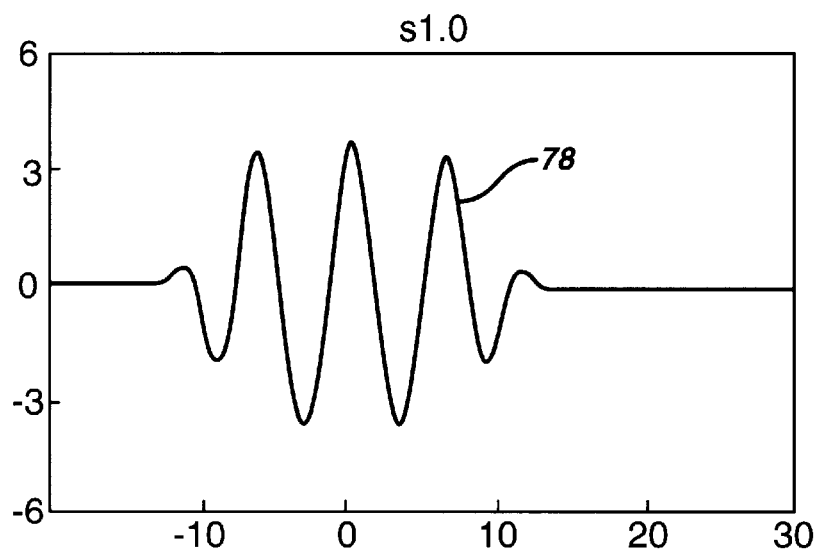
Figure 5F:
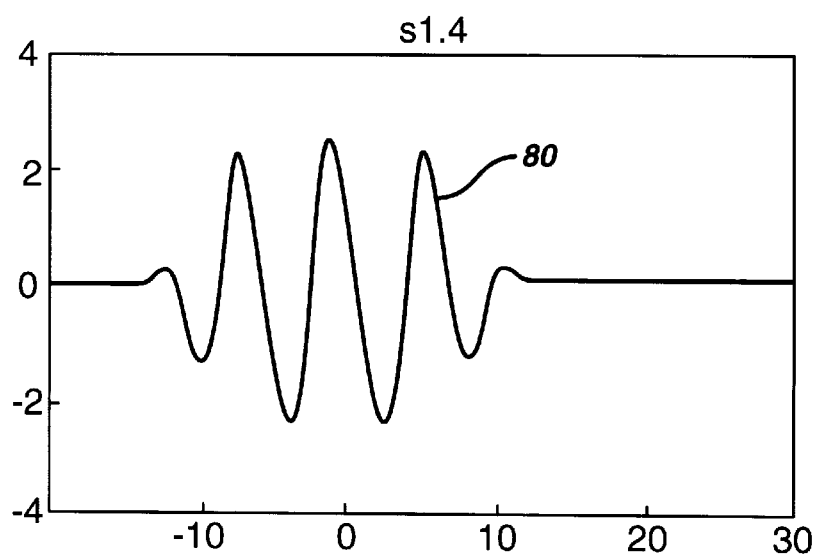

When predistorted waveform 70 is used as a transmit waveform, it will undergo the effects depicted in the sequence of FIGS. 5b–5f as it travels to and beyond the target plane, which is set at the focal point in this example. In FIG. 5b the waveform 72, at 40% of the distance to the target plane, exhibits diffraction effects as the beam begins to come into focus. At 60% (waveform 74) and 80% (waveform 76) of the distance to the target plane, the beam is substantially focused and a substantially linear waveform has developed. When the wave reaches the target plane, a smoothly linear waveform 78 has resulted from the predistorted transmit waveform, as shown in FIG. 5e. The waveform is still substantially linear when it has traveled to a point 40% beyond the target plane, as waveform 80 in FIG. 5f shows.

Waveform 70 is the predistorted waveform at the center element of the transducer. The predistorted waveforms for the rest of the elements of the transducer are produced by the KZK solution in the same calculation that results in waveform 70. The calculation is performed for the total plane.

When a harmonic contrast agent is present at the target such as tissue perfused with an agent, the linear waveform 78 will interact with the agent to produce an echo with a nonlinear component which is substantially the result of the agent nonlinear oscillation caused by insonification. The resulting echo returned to the transducer at the origin will contain a nonlinear component which is almost entirely a result of this interaction. There is virtually no contribution of nonlinearities due to tissue distortion. While the returning echo passes through tissue on its return trip, its amplitude is low enough such that only negligible tissue distortion will result.

Figure 6:
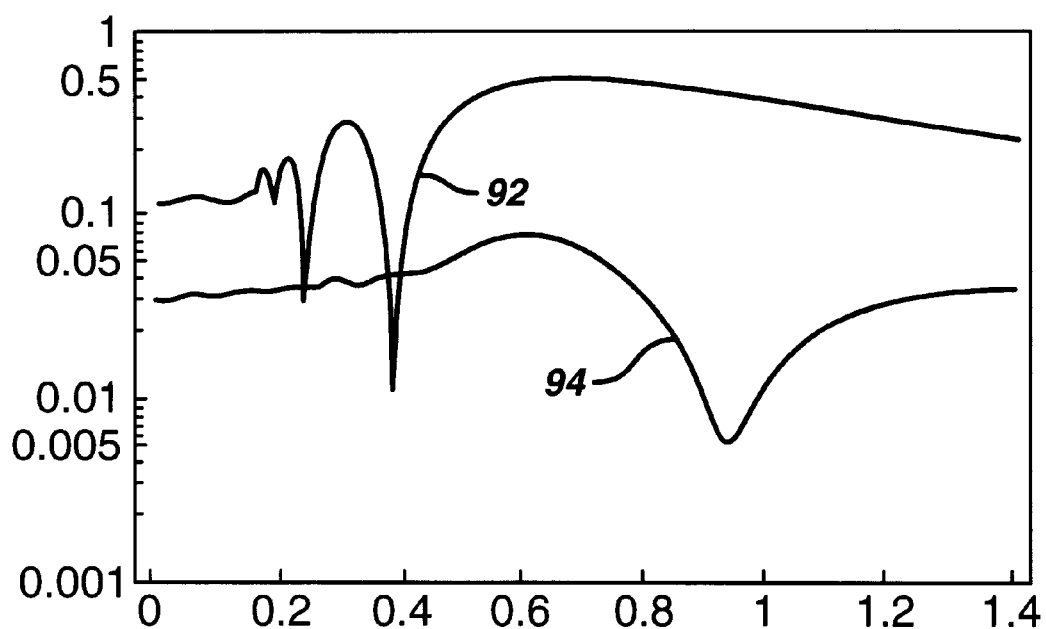
FIG. 6 illustrates the relative amounts of energy in the fundamental and second harmonic spectra as a predistorted ultrasonic pulse travels through tissue.

These effects are shown in FIG. 6 which, like FIG. 2, depicts the relative energy content of the fundamental and harmonic spectra of a transmitted ultrasound pulse. The upper curve 92 which plots the buildup of fundamental frequency energy with passage of a predistorted pulse through tissue is seen to be similar to curve 22 of FIG. 2. The nonlinear or harmonic spectrum energy buildup is quite different, as shown by curve 94. In comparison with curve 24, curve 94 starts at a much higher nonlinear energy content at the origin, which is to be expected with the transmission of a nonlinearly predistorted transmit pulse. But as the waveform becomes increasingly undistorted as the target or focal point ("1" on the abscissa) is approached, the nonlinear or harmonic energy content is seen to decline to a minimum level. The benefit of the present invention may be realized by comparing the relatively small disparity between curves 22 and 24 at the target, in comparison with the relatively large disparity between curves 92 and 94 at that point.

Figure 7:
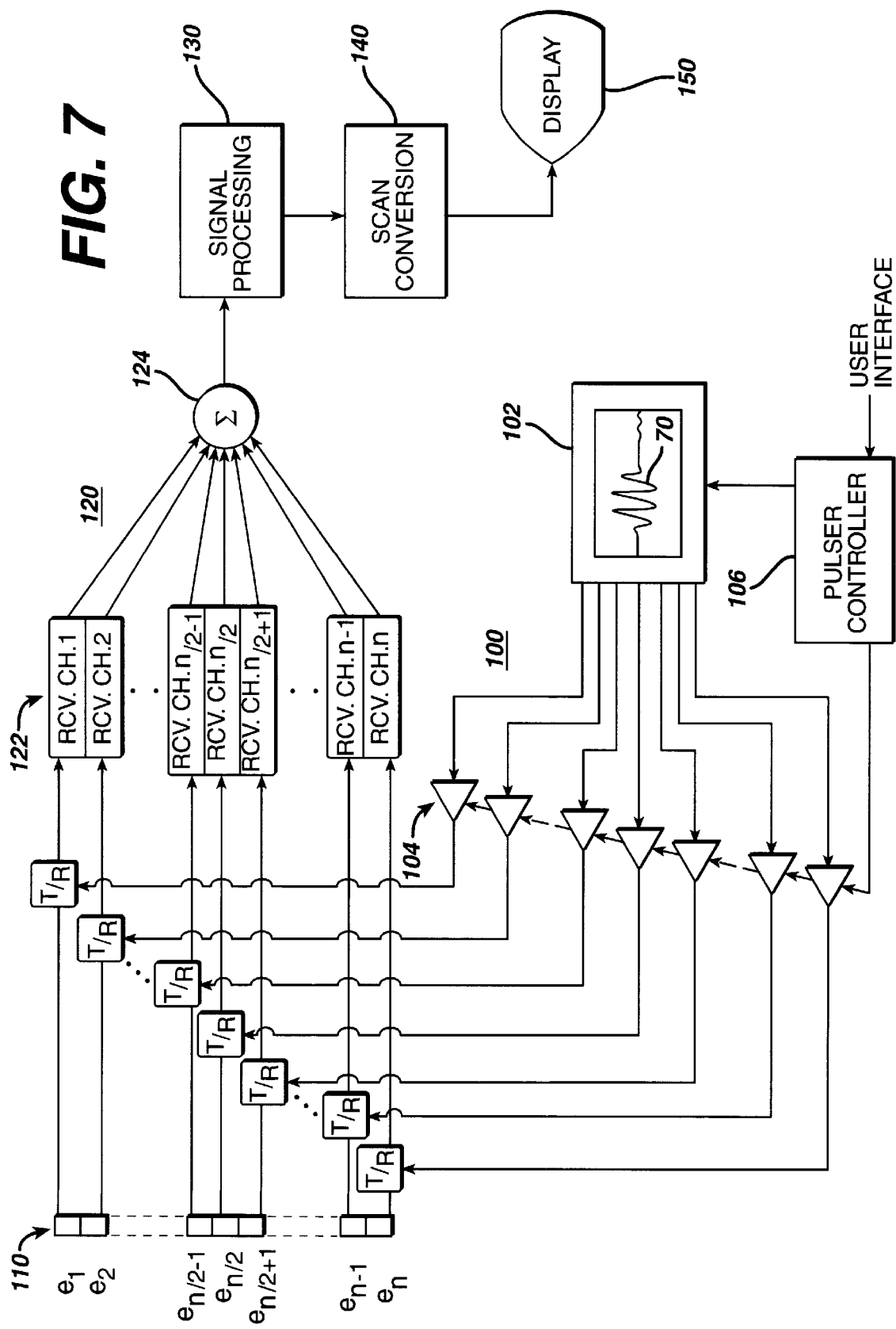
FIG. 7 illustrates an ultrasonic diagnostic imaging system which transmits predistorted ultrasonic waveforms for imaging contrast agents.

The predistortion characteristics of the transmit waveform 70 are used to program a transmit beamformer 100 to transmit an ultrasonic pulse of this character as shown in FIG. 7. The predistorted waveform characteristics are stored in a predistorted waveform memory 102. Different predistorted waveform characteristics may be stored for different target distances and focal lengths of the transducer, and different predistorted waveforms computed and stored for the elements of a variety of different transducers. When the operator of the ultrasound systems selects a particular transducer and target depth through the controls of the user interface, these commands actuate a pulser controller 106 to select the proper predistortion waveform characteristics from the predistorted waveform memory 102 and apply them to pulsers 104. The pulsers 104 then drive the elements $e_1$–$e_n$ of a transducer 110 with individual predistorted transmit waveforms at the proper times by way of transmit/receive switches T/R to achieve the necessary beam steering and focusing to scan an image. The echo signals resulting from the transmit waveform transmission are received by the transducer elements $e_1$–$e_n$ and coupled by way of the T/R switches to delay channels 122 of a receive beamformer 120. The receive beamformer sums the signals from the transducer elements to produce a coherent echo signal at the output of the beamformer summer 124. Each received scanline of echo signals undergoes signal processing 130 such as bandpass filtering of a harmonic signal passband, detection, or display signal estimation, and is put into the desired image format by scan conversion 140. The resultant ultrasonic image is displayed on an image display 150.

What is claimed is:

1. A method for using an ultrasonic wave transmitter to insonify an acoustic target in the body with a waveform of fundamental frequency components and substantially no harmonic components at the target, comprising the steps of:

determining the nonlinear effects upon a transmitted ultrasonic wave between said transmitter and said target; and transmitting a predistorted ultrasonic wave which has been predistorted in consideration of said nonlinear effects.

2. The method of claim 1, wherein said step of determining comprises using a tissue model.

3. The method of claim 2, wherein said step of using a tissue model comprises using a mathematical model which includes a term representing nonlinear tissue effects.

4. A method for using an ultrasonic wave transmitter to insonify an acoustic target in the body with a waveform of fundamental frequency components and substantially no harmonic components at the target, comprising the steps of:

determining the nonlinear effects upon a transmitted ultrasonic wave between said transmitter and said target; and transmitting a predistorted ultrasonic wave which has been predistorted in consideration of said nonlinear effects;

wherein said step of determining comprises using a tissue model;

wherein said step of using a tissue model comprises using a mathematical model which includes a term representing nonlinear tissue effects; and wherein said mathematical model comprises the Khokhlov-Zabolotskaya-Kuznetsov model.

5. A method for using an ultrasonic wave transmitter to insonify an acoustic target in the body with a waveform of fundamental frequency components and substantially no harmonic components at the target, comprising the steps of:

determining the nonlinear effects upon a transmitted ultrasonic wave between said transmitter and said target; and transmitting a predistorted ultrasonic wave which has been predistorted in consideration of said nonlinear effects;

wherein said step of determining comprises:

determining the form of a linear field at said target; and determining the form of a transmitted ultrasonic wave which will result in said linear field in consideration of the nonlinear effects between said transmitter and said target.

6. The method of claim 5, wherein said step of determining the form of a linear field comprises determining the form of a linear field resulting from the transmission of a linear waveform by said transmitter.

7. The method of claim 6, wherein said step of determining the form of a linear field comprises determining the form of a linear field resulting from the transmission through a linear medium of a linear waveform by said transmitter.

8. The method of claim 5, wherein said step of determining the form of a linear field comprises using a mathematical model of a linear transmission medium.

9. A method for using an ultrasonic transducer array to insonify an acoustic target in the body with a waveform of fundamental frequency components and substantially no harmonic components at the target, comprising the steps of:

determining a linear field at said target which would result from transmission of a waveform by said transducer array;

determining characteristics of a transmit waveform which would result in said linear field at said target after passage through a nonlinear medium; and transmitting a predistorted ultrasonic wave which has been predistorted in consideration of said characteristics.

10. The method of claim 9, wherein said step of determining characteristics utilizes a waveform transmission model having nonlinear tissue characteristics.

11. The method of claim 10, wherein said waveform transmission model comprises a mathematical tissue model.

12. The method of claim 9, wherein said step of determining a linear field utilizes a linear waveform transmission model.

13. The method of claim 12 wherein said linear waveform transmission model comprises a mathematical model.

14. A method for using an ultrasonic transducer array to insonify an acoustic target in the body with a waveform of fundamental frequency components and substantially no harmonic components at the target, comprising the steps of:

utilizing a tissue model having diffraction and nonlinear characteristics to determine the effects upon an ultrasonic wave transmitted between said transmitter and said target; and transmitting a predistorted ultrasonic wave which has been predistorted in consideration of said effects.

15. The method of claim 14, wherein said tissue model further has absorption characteristics.

16. The method of claim 15, wherein said tissue model comprises a mathematical tissue model having diffraction, absorption, and nonlinear terms.

17. The method of claim 14, wherein said step of utilizing comprises:

determining the characteristics of a linear field at said target which would result from the transmission of a waveform by said transducer array which is subject to diffraction effects; and utilizing said linear field characteristics with a tissue model having diffraction and nonlinear characteristics to determine the characteristics of a waveform which, when transmitted through tissue by said transducer array, would produce said linear field characteristics at said target.

18. An ultrasonic diagnostic imaging system which is capable of transmitting an ultrasonic wave to a target in the body which will result in insonification of the target with a substantially linear field, comprising:

an ultrasonic transducer;

a memory for storing predistortion characteristics for a transmit waveform; and a transmitter, coupled to said ultrasonic transducer and responsive to said stored predistortion characteristics, for transmitting ultrasonic waves which have been predistorted in consideration of tissue distortion effects between said transducer and said target.

19. The ultrasonic diagnostic imaging system of claim 18, wherein said ultrasonic transducer comprises an array of transducer elements; and wherein said memory stores predistortion characteristics for the elements of said array.

20. The ultrasonic diagnostic imaging system of claim 18, wherein said ultrasonic transducer comprises an array of transducer elements;

wherein said transmitter comprises a plurality of individual transmitters coupled to elements of said array; and wherein said memory comprises means for storing a predistorted transmit waveform for each of said transmitters.

21. An ultrasonic diagnostic imaging system for producing harmonic contrast agent enhanced images with reduced interference from tissue nonlinearity comprising:

an array of ultrasonic transducer elements;

means for exciting the elements of said array with predistorted transmit waveforms which result in the development of a substantially linear field at a target region of the body;

means for receiving echo signals from contrast agent at said target region having nonlinear signal components mainly resulting from the interaction of a linear waveform with said contrast agent; and means for utilizing the nonlinear signal components of said received echo signals to form an ultrasonic image of said contrast agent.

22. The ultrasonic diagnostic imaging system of claim 21, wherein said means for exciting comprises a plurality of transmitters coupled to said transducer elements for driving said elements with predetermined nonlinear transmit waveforms.

23. The ultrasonic diagnostic imaging system of claim 21, wherein said means for means for utilizing the nonlinear signal components comprises means for forming a harmonic ultrasonic image of said contrast agent.

* * * * *